United States Patent [19]

Chu

[11] Patent Number: 4,595,228
[45] Date of Patent: Jun. 17, 1986

[54] GARAGE DOOR OPENING TRANSMITTER COMPARTMENT

[75] Inventor: Zooey C. Chu, Holland, Mich.

[73] Assignee: Prince Corporation, Holland, Mich.

[21] Appl. No.: 605,583

[22] Filed: Apr. 30, 1984

[51] Int. Cl.$^4$ ............................................. B60R 5/00
[52] U.S. Cl. .................................... 296/37.7; 312/319
[58] Field of Search ............... 296/37.1, 37.5, 37.7, 296/37.8, 37.12; 224/311, 312; 200/61.62, 61.7, 61.81, 61.82; 312/319, 320, 328, 351; 455/345, 346, 99

[56] References Cited

U.S. PATENT DOCUMENTS

| | | | |
|---|---|---|---|
| 2,281,808 | 5/1942 | Smiley | 200/153 R |
| 3,193,673 | 7/1965 | Herring | 200/61.62 X |
| 3,233,071 | 2/1966 | Buzzell | 200/330 |
| 3,663,781 | 5/1972 | Zimmerman et al. | 200/330 |
| 3,689,724 | 9/1972 | Labude et al. | 200/330 |
| 3,849,615 | 11/1974 | Fisher | 200/61.81 |
| 4,146,762 | 3/1979 | Peck et al. | 200/61.7 X |
| 4,241,870 | 12/1980 | Marcus | 296/37.7 |
| 4,247,850 | 1/1981 | Marcus | 224/312 X |
| 4,275,913 | 6/1981 | Marcus | 296/37.1 |
| 4,334,134 | 6/1982 | Janda | 200/314 |
| 4,394,552 | 7/1983 | Schlosser | 200/61.62 |
| 4,469,365 | 9/1984 | Marcus et al. | 296/37.7 |

Primary Examiner—Robert B. Reeves
Assistant Examiner—Carol L. Olson
Attorney, Agent, or Firm—Price, Heneveld, Huizenga & Cooper

[57] ABSTRACT

A housing defines a compartment with an opening for receiving a garage door opening transmitter with an actuator switch. A door is pivotally coupled to the housing for covering the opening and includes an actuator for engaging the actuator switch on the garage door opening transmitter when the door is closed and depressed inwardly toward the interior of the compartment.

15 Claims, 9 Drawing Figures

GARAGE DOOR OPENING TRANSMITTER COMPARTMENT

BACKGROUND OF THE INVENTION

The present invention relates to a compartment for use in storing a portable garage door opening transmitter, and particularly one with a closure door which serves as the actuating means for the transmitter.

Electrically operated garage doors and the associated remote transmitters are becoming increasingly popular. The remote transmitter is usually a portable battery powered unit which is carried in the homeowner's vehicle for selectively transmitting an electromagnetic radiation signal when actuated. The signal, in turn, is received by a garage door control receiver for controlling the garage door opening mechanism attached to the door. Garage door opening transmitters usually are portable units with the vehicle owners typically clipping them to the vehicle's visor or in some cases, removably mounting them to the dashboard. Sometimes the transmitters are placed in an accessory tray or even in the glove box.

There exists several inconveniences with such prior mounting schemes, not the least of which is the necessity to reach to an inconvenient location to gain access to the transmitter. If it is mounted on a visor, it is necessary to steer and watch the movement of the vehicle toward the garage door while reaching and locating the typically relatively small actuating button for actuating the transmitter. Garage door opening transmitters removably mounted to the dashboard typically have to be removed from the dash and directed toward the garage door for operation. If mounted on the visor, the transmitter becomes a safety hazard in the form of a relatively hard projection at the head level of the vehicle. Further, it obstructs motion of the visor, which when moved, sometimes knocks the transmitter from the visor. Thus, such an arrangement interferes with the visor use as well as poses a safety hazard.

Recently, garage door opening transmitters have been integrally mounted within the body of a visor, as disclosed for example in U.S. Pat. No. 4,247,850, or in a housing mounted between the visors of a vehicle, as represented in U.S. Pat. No. 4,241,870. Both of these typically original equipment manufactured installations of a garage door opening transmitter or its housing represent a significant improvement over the portable, clip-on-type transmitters. Although solving many of the problems with the prior art portable transmitting units, these systems are not designed to accommodate a variety of different transmitter units which the homeowner may have since they employ unique packaging for the transmitter.

SUMMARY OF THE PRESENT INVENTION

The present invention provides a compartment for universally receiving any number of conventional, portable, hand-held transmitter units. The compartment positions the garage door opening transmitter in an area both readily accessible by the driver and also located to direct radiation outwardly from the vehicle for effective use of the transmitter. Further, the system of the present invention provides a relatively large door panel which serves as an actuating control surface such that the vehicle operator can readily actuate the garage door opening transmitter contained within the compartment.

Apparatus embodying the present invention includes a housing defining a compartment with an opening for receiving a garage door opening transmitter with an acutator switch. A door is movably coupled to the housing for covering the opening and includes an actuator for engaging an actuating switch on the garage door opening transmitter when the door is closed and depressed inwardly toward the interior of the compartment. In one embodiment of the invention, the garage door opening transmitter is secured by VELCRO ® fastening material to the housing, and in an alternative embodiment of the invention, the garage door opening transmitter is held by a retainer panel snap-fitted within the compartment.

These and other features, objects and advantages of the present invention will become apparent upon reading the following description thereof together with reference to the accompanying drawings in which: dr

DETAILED DESCRIPTION OF THE PREFERRED EMBODIMENT

Figure 1:
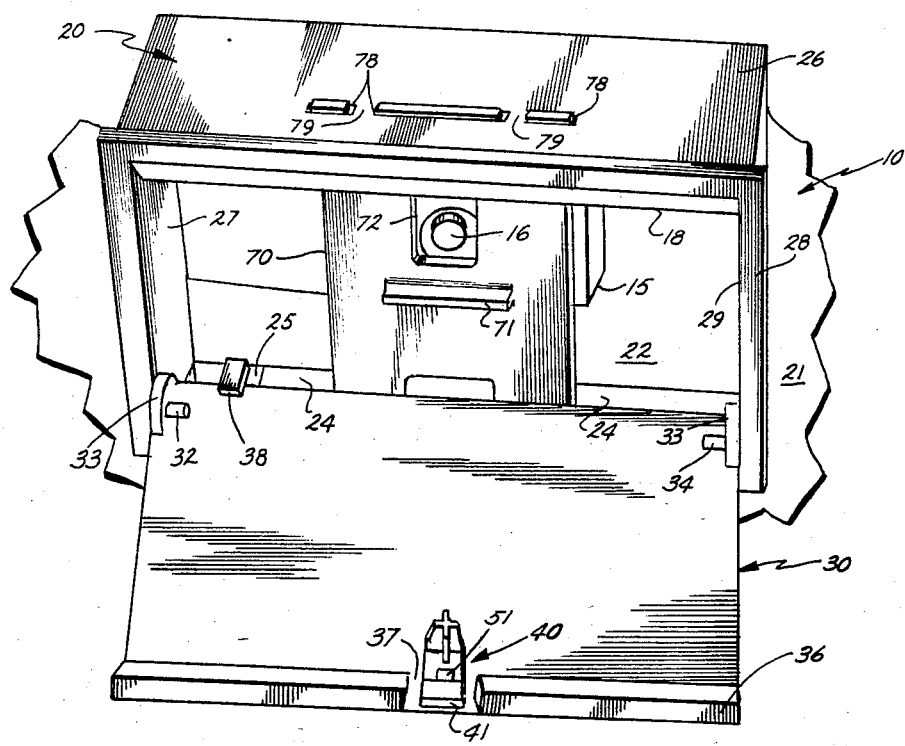
FIG. 1 is a fragmentary, perspective view of one embodiment of the present invention shown mounted to the roof of a vehicle.

Referring initially to FIG. 1, there is a shown a garage door opening transmitter compartment 10 embodying the present invention and which includes a housing 20 defining in part the compartment for a conventional, portable, battery powered garage door opening transmitter 15. Transmitter 15 has an actuator switch 16 which, when depressed, actuates unit 15 to transmit an electromagnetic radio frequency signal to a receiver mounted within a garage and coupled to a door actuating mechanism for opening and closing a garage door. Housing 20 is integrally molded of a suitable polymeric material, such as polyvinyl chloride, and includes a ceiling 22, a forward wall 24, a rear wall 26 and sidewalls 27 and 29. A peripheral trim flange 28 is coupled to the lower edge of the walls and extends outwardly over the fabric headliner 21 of the vehicle when the housing is secured to the roof 23 of the vehicle by suitable mounting brackets and fastening means such as screws or the like.

Figure 2:
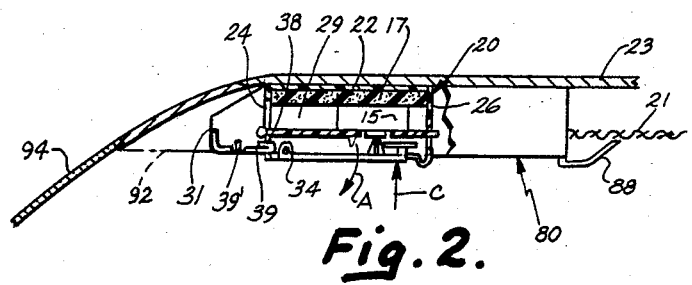
FIG. 2 is a reduced size, vertical, cross-sectional view of the structure shown in FIG. 1 with the addition of a rear storage compartment.
Figure 3:
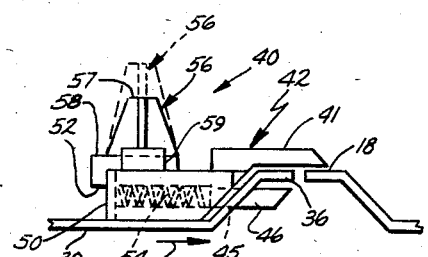
FIG. 3 is an enlarged, fragmentary, vertical, cross-sectional view, partly in phantom form, of the latch and actuator assembly shown in FIG. 1.

Pivotally coupled to enclose and define a floor for housing 20 is a door 30 which pivots downwardly from housing 20, as illustrated by arrow A in FIG. 2. Door 30 includes a pair of integral pivot pins 32 and 34 secured by mounting bosses 33 at the forward corners of the door 30. The pivot pins 32 and 34 extend through suitable apertures 35 (FIG. 7) in sidewalls 27 and 29 of housing 20. The rearward edge of door 30 includes an S-shaped edge 36, as best seen in FIG. 3, and a latch and actuator assembly 40. Door 30 further includes an L-shaped bracket 38 mounted to its forward edge near one corner and which extends through an aperture 25 in rear wall 24 to be engaged by a leaf spring 39 (FIG. 2) mounted forwardly of the pivot axes 32 and 34 to urge the door toward an open position against the latch for the purpose described below. Leaf spring 39 is mounted on an extension 31 of housing 20 which can be an elongation of the peripheral flange 28 or a trapizoidal-shaped nose piece, as illustrated in the embodiment shown in FIG. 2. The leaf spring is anchored to member 31 by a suitable fastening means 39' such as integrally formed rivets extending through apertures in the end of the leaf spring and deformed thereover by application of heat.

Extending forwardly along the inner edge of rearwall 26 is a locking flange 18 which is beveled upwardly to mate with member 36 on the door to provide a recessed interconnection between the edge of the door and the housing 20, as best seen in FIG. 3 now described.

The latch assembly is a sliding-type latch and includes a chisel-edge latch bar 41 which slides over the top surface of member 18 when in a latched position, illustrated in FIG. 3. The edge 36 of door 30 is notched at 37 (FIG. 1) to provide clearance for the sliding latch mechanism which includes a sliding, U-shaped body 42 integrally defining bar 41 and push button 46 for controlling the latch. An aperture 45 is formed through the body door permitting extension of button 46 therethrough. Body 42 is slidably supported by a bracket 50 secured to the upper surface of door 30 and including a slot 51 for captively but slidably containing body 42. A compression spring 54 is mounted within bracket 50 and is shown in phantom form in FIG. 3. Spring 54 engages a rear wall of bracket 50 at one end and the base of the U-shaped latch body 42 at its opposite end and thus urges the body 42 and the chisel-shaped latch member 41 in a direction indicated by arrow B for latching the cover in a closed position, as shown in FIG. 3.

Extending upwardly from bracket 50, near the forward edge thereof, is a removable actuating member 56 in the form of a truncated X-shaped cone with an upper surface 57 which engages actuator button 16 of the garage door opening transmitter 15. Member 56 is mounted to a flat, rectangular base 58 which is captively and slidably held in place on the upper surface of member 50 by a pair of inwardly directed L-shaped flanges 59 which extend upwardly from body 50 at opposite sides of base 58. The actuator member 56 can be slid from the members 59 to permit installation of different height actuator members 56' (shown in phantom) included with the system. Thus, the vertical position of surface 57 with respect to button 16 can be controlled such that a variety of garage door transmitters can be accommodated. A stop lip 52 on base 58 engages the wall of bracket 50 and indexes the actuator 56 with respect to the fore and aft direction of housing 20.

Figure 5:
FIG. 5 is a side elevational view of the structure shown in FIG. 4.
Figure 6:
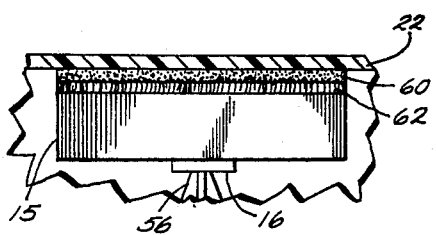
FIG. 6 is a fragmentary, vertical, cross-sectional view of the preferred mounting structure for the garage door opening transmitter.

In the preferred embodiment of the invention, the transmitter 15 is held in position against the ceiling 22 of compartment 20, as illustrated in FIG. 6, with a VELCRO ® fastener having an adhesive backed strip 60 of loops secured to ceiling 22 and an adhesive backed strip of hooks 62 secured to the top surface of the transmitter 15. The strips 60 and 62 are sufficiently large so that transmitter 15 can be adjusted within the confines of the compartment to align button 16 with actuator 56. Alternatively, the retainer structure shown in FIGS. 1, 2, 4 and 5 can be employed.

Figure 4:
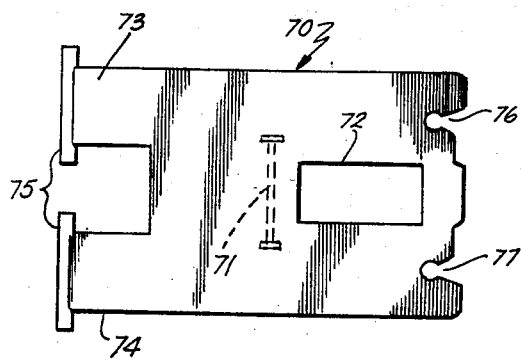
FIG. 4 is an enlarged, bottom plan view of a retainer panel for a garage door opening transmitter.

Retainer means 70, as best seen in FIGS. 1, 4 and 5, comprises a generally rectangular, resilient polymeric panel with opposite bifurcated ends and with an alignment slot 72 through which actuator button 16 of the garage door opener 15 extends. Adjacent slot 72 is a handle 71 permitting insertion and removal of the retainer for installation and removal of the transmitter. At the forward end of panel 70 is a pair of legs 73 and 74 each with an integral, somewhat wider, cylindrical end 75 thereon for fitting the forward end of panel 70 into T-shaped slots 76 formed in forward wall 22, as described below. The opposite end of panel 70 includes a pair of notches 76 and 77 dividing the end into three tangs which extend through three slots 78 formed in the rear wall 26 of housing 20 with the notches 76 and 77 lockably receiving lands 79 between the slots 78, as best seen in FIG. 1.

For installation of the garage door opener with the retainer panel 70, the garage door opener is first positioned in the compartment and ends 75 are inserted into the widened upper portion of T-shaped slots 76 (FIG. 8) which allow the narrower body portions 73 and 74 to slide downwardly through the narrowed portion of the slots with the ends being held in this lower locked position by the presence of the garage door opener transmitter 15. The panel is then pushed upwardly until notches 76 and 77 snap-fit to the lands 79 for holding the rear of the panel in place.

Door 30 is then closed and latched, as illustrated in FIG. 3, with the actuator 56 aligned with its end 57 positioned immediately adjacent actuator button 16 of the garage door opening transmitter. A foam pad 17 can be positioned between ceiling 22 and transmitter 16, as shown in FIG. 2, to assist in seating the transmitter within the compartment. It is noted that slot 72 allows the transmitter to be moved in a fore and aft direction in relationship to the center line of the compartment where the actuator member 56 is positioned. Thus, by sliding the garage door opening transmitter 15 fore and aft, precise alignment with the end 57 of actuator 56 is assured. Similarly, by inserting the proper height actuator 56, with the door closed and latched in a position illustrated in FIG. 3, the end surface 57 of actuator 56 is touching but not depressing switch 16. The latch mechanism allows the door to be pushed upwardly, in a direction indicated by arrow C in FIG. 2, and button 16 to be depressed and actuating the transmitter.

Figure 7:
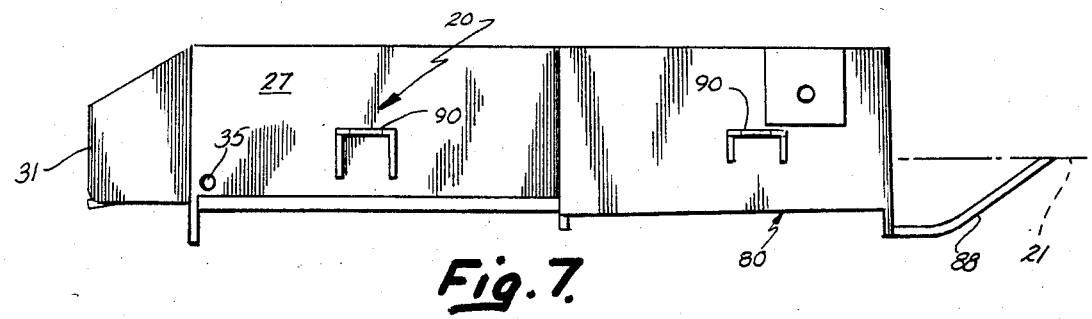
FIG. 7 is an enlarged, left side elevational view of the housing shown in FIG. 2.
Figure 8:
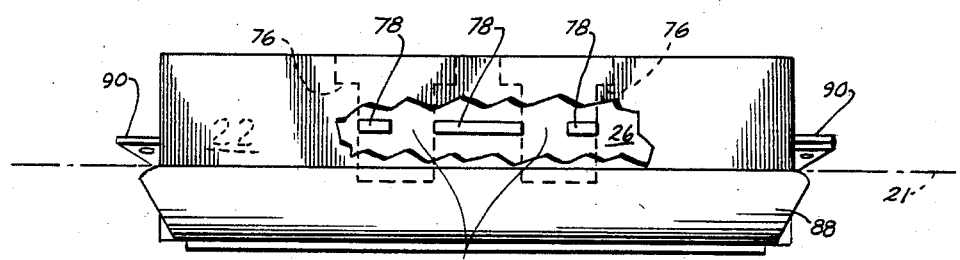
FIG. 8 is a rear elevational view, partly broken away, of the structure shown in FIG. 7.
Figure 9:
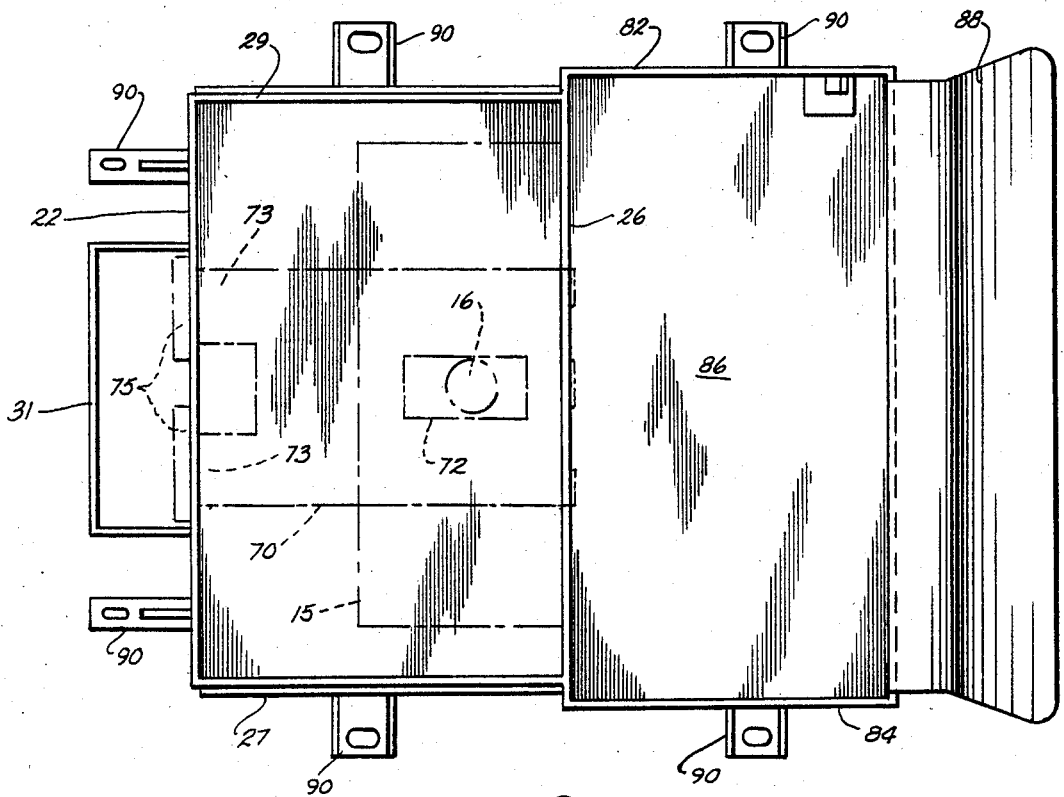
FIG. 9 is a bottom plan view of the housing illustrated in FIG. 7, partly in phantom form, illustrating the positioning of the garage door opening transmitter and retainer panel.

In the preferred embodiment, housing 20 can be integral with an additional housing 80, as illustrated in FIGS. 7-9, to form an integral structure with housing 80 defining a storage compartment for small items such as sunglasses which can be constructed as in a manner similar to that shown in U.S. patent application Ser. No. 403,062, filed on July 29, 1982, entitled AUTOMOTIVE SUNGLASS STORAGE SYSTEM, except the compartment is aligned laterally instead of longitudinally within the vehicle.

In the embodiment shown in FIGS. 2, and 7-9, the integral storage compartment 80 also includes sidewalls 82, 84 and a ceiling 86 with common wall 26 joining housing 80 with housing 20. A decorative flange 88 extends from the rear edge of housing 80 and suitable mounting tabs 90 extend at spaced locations around the periphery of the integral housing for securing the housing to the sheet metal roof of the vehicle. The integral housings 20 and 80 can be mounted within a console including sidewalls and the like which provide a trim appearance against the headliner of a vehicle with the console including an area 92, shown in phantom form in FIG. 2, immediately above and behind the windshield 94 of a vehicle for housing a variety of instruments such as a digital compass system described in U.S. Pat. No. 4,424,631. Thus, the garage door opening transmitter compartment 10 can be incorporated in an overall console design including other vehicle accessories with the transmitter being preferably located in the headliner, as illustrated in FIG. 2, and laterally aligned with the center line of the vehicle.

By providing a relatively large surface area door 30, the transmitter 15 can be relatively easily actuated without the necessity of the operator having to look for the small actuating button 16 on the transmitter. Depression of the door which is unrestricted by latch member 41 from upward movement will pivot the door upwardly a sufficient distance to actuate the transmitter. The leaf spring 39 together with the spring resiliency of switch 16 will urge the door downwardly into the latched seated position, illustrated in FIG. 3. Further if the transmitter 15 is not in housing 20, spring 39 holds the door securely closed to prevent rattling. In the embodiments shown, door 30 was a relatively large panel having a dimension of about 3 inches by 6 inches and like housing 20 and retainer 70, made of A.B.S. plastic.

It will become apparent to those skilled in the art that various modifications to the preferred embodiments of the invention described herein can be made without departing from the spirit or scope of the present invention as defined by the appended claims.

The embodiments of the invention in which an exclusive property or privilege is claimed are defined as follows:

1. A combination of a remote control transmitter and a compartment therefor comprising:
   a remote control transmitter having an actuator switch;
   a housing defining a compartment with an opening for receiving said transmitter;
   a door movably mounted on said housing to at least three positions including an open position in which said transmitter can be inserted and removed from said compartment, a normal closed position for covering said opening and a third position located inwardly of said normal closed position; and
   actuator means coupled to said door and positioned for engaging and actuating said actuator switch of said transmitter when said door is closed and depressed to said third position inwardly toward said compartment; said actuator means, door and transmitter being interrelated so that when said transmitter is located in said compartment and said door is in normal closed position said actuator switch is not actuated and when said door is depressed to said third position said actuator switch is actuated.

2. The apparatus as defined in claim 1 wherein said actuator means comprises projection means of adjustable height to accommodate different transmitters.

3. The apparatus as defined in claim 2 wherein said projection means comprises a plurality of selectable projection elements having different heights and each including means for removably coupling said element to said door.

4. The apparatus as defined in claim 1 and further including means for retaining said transmitter in said compartment in predetermined relationship with respect to said actuator means coupled to said door.

5. The apparatus as defined in claim 4 wherein said retainer means comprises a retainer panel removably coupled to said housing, said panel including an aperture for access to the actuator switch of said transmitter.

6. The apparatus as defined in claim 1 and further including latch means for selectively holding said door in a closed position.

7. A combination of a remote control transmitter and a compartment therefor comprising:
   a remote control transmitter having an actuator switch;
   a housing defining a compartment with an opening for receiving a said transmitter, said housing including means for securing said housing to the roof of a vehicle;
   a door pivotally coupled to said housing for covering said opening; said door movable to at least three positions including an open position in which said transmitter can be inserted and removed from said compartment, a normal closed position for covering said opening and a third position located inwardly of said normal closed position;
   latch means extending between said door and said housing for releasably holding said door in a closed position and permitting said door to pivot upwardly to said third position located slightly beyond the closed position; and
   actuator means coupled to said door and positioned for engaging and actuating said actuator switch of said transmitter when said door is closed and depressed to said third position upwardly toward said compartment; said actuator means, door and transmitter being interrelated so that when said transmitter is located in said compartment and said door is in normal closed position said actuator switch is not actuated and when said door is depressed to said third position said actuator switch is actuated.

8. The apparatus as defined in claim 7 and further including means for retaining said transmitter in said compartment in predetermined relationship with respect to said actuator means coupled to said door.

9. The apparatus as defined in claim 8 wherein said actuator means comprises projection means of adjustable height to accommodate different transmitters.

10. The apparatus as defined in claim 9 wherein said projection means comprises a plurality of selectable projection elements having different heights and each including means for removably coupling said element to said door.

11. The apparatus as defined in claim 8 wherein said retainer means comprises a retainer panel removably coupled to said housing, said panel including an aperture for access to the actuator switch of said transmitter.

12. A combination remote control transmitter and a transmitter mounting and actuating system for a vehicle comprising:
   means for holding said transmitter in a fixed position in a vehicle;
   panel means movable to at least three positions with respect to said transmitter while it is being held by said holding means; said positions including a position in which said transmitter can be inserted and removed from said holding means, a normal closed position for covering said transmitter, and a third position located toward said transmitter from said closed position; and actuator means coupled to said panel means and positioned for engaging and actuating said actuator switch of said transmitter held by said holding means for actuating the transmitter when said panel is pressed to said third position;

said actuator means, panel and transmitter being interrelated so that when said transmitter is being held by said holder means and said panel is in the normal closed position said actuator switch is not actuated and when said panel is pressed to said third position said actuator switch is actuated.

13. The apparatus as defined in claim 12 wherein said holding means includes a housing defining a compartment with an opening for receiving said transmitter.

14. The apparatus as defined in claim 13 wherein said panel means comprises a door movably mounted to selectively close said opening of said compartment.

15. The apparatus as defined in claim 14 wherein said holding means further includes retainer means for securing said transmitter within said compartment in a predetermined relationship with respect to said actuator means.

* * * * *

UNITED STATES PATENT AND TRADEMARK OFFICE
CERTIFICATE OF CORRECTION

PATENT NO. : 4,595,228

DATED : June 17, 1986

INVENTOR(S) : Zooey C. Chu

It is certified that error appears in the above-identified patent and that said Letters Patent is hereby corrected as shown below:

Column 2, line 18:
  after ":" delete "dr";
Column 2, line 48:
  after "is" delete "a";
Column 2, line 58:
  "suitable" should be --suitable--;
Column 3, line 16:
  "trapizoidal-shaped" should be
  --trapezoidal-shaped--;
Column 3, line 23:
  "rearwall" should be --rear wall--;
Column 3, line 52:
  "rectangular" should be --rectangular--;
Column 3, line 59:
  "vertical" should be --vertical--;
Column 4, line 15:
  "panel" should be --panel--;
Column 4, line 38:
  "immediately" should be --immediately--;
Column 5, line 13:
  "10" should be --10--;
Column 6, line 19, claim 7:
  after "receiving" delete "a".

Signed and Sealed this

Twenty-eighth Day of October, 1986

[SEAL]

*Attest:*

DONALD J. QUIGG

*Attesting Officer*  *Commissioner of Patents and Trademarks*